(12) United States Patent
Bolosan et al.

(10) Patent No.: US 9,630,670 B2
(45) Date of Patent: Apr. 25, 2017

(54) BICYCLE SAFE SYSTEM

(71) Applicants: Adrian Bolosan, Los Angeles, CA (US); Collin Corey, Los Angeles, CA (US)

(72) Inventors: Adrian Bolosan, Los Angeles, CA (US); Collin Corey, Los Angeles, CA (US)

( * ) Notice: Subject to any disclaimer, the term of this patent is extended or adjusted under 35 U.S.C. 154(b) by 0 days.

(21) Appl. No.: 14/806,426

(22) Filed: Jul. 22, 2015

(65) Prior Publication Data

US 2017/0021886 A1 Jan. 26, 2017

(51) Int. Cl.
*B62J 9/00* (2006.01)
*B62J 11/00* (2006.01)

(52) U.S. Cl.
CPC ..................................... *B62J 9/001* (2013.01)

(58) Field of Classification Search
CPC ..... B62J 9/00; B62J 9/001; B62J 9/005; B62J 11/00
See application file for complete search history.

(56) References Cited

U.S. PATENT DOCUMENTS

| | | | |
|---|---|---|---|
| 1,388,090 A * | 8/1921 | Brassler | A47G 29/24 232/41 E |
| 4,088,250 A * | 5/1978 | Schaefer | A45F 3/16 215/395 |
| 4,577,477 A * | 3/1986 | Olshausen | B62J 11/00 70/233 |
| 5,007,566 A * | 4/1991 | Fick | B62J 11/00 224/414 |
| 5,249,702 A * | 10/1993 | Topp | A47G 19/2266 215/229 |
| 5,326,006 A * | 7/1994 | Giard, Jr. | B62J 11/00 215/387 |
| 5,390,836 A * | 2/1995 | Faulds | B62J 11/00 224/414 |
| 5,590,801 A * | 1/1997 | Cohen | B65D 55/14 220/315 |
| 6,637,244 B2 * | 10/2003 | Haraughty | B62H 5/003 70/18 |
| 6,837,407 B1 * | 1/2005 | Towers | B62J 9/005 220/840 |
| 8,061,169 B2 * | 11/2011 | Young | B62H 5/00 411/910 |
| 8,757,413 B1 * | 6/2014 | Kephart | B62J 9/005 206/804 |

(Continued)

*Primary Examiner* — Brian D Nash
(74) *Attorney, Agent, or Firm* — Sheppard Mullin Richter & Hampton LLP (57) ABSTRACT

A cycle safe system for providing secure storage of items on a bicycle. The cycle safe includes a container having a body and a cap, the cap housing a locking mechanism with a user interface on a top face and a latch capable of being extended out of the cap via a latch opening disposed on the side of the cap, and a bracket having a base member with an anchor opening at one end, a stopper at the opposite end, and a lateral support component connected to one or more sides of the base member, the lateral support component configured to enclose the container. When the container is inserted into the bracket and the locking mechanism is engaged, the latch engages with the anchor opening and the container is immovably secured in the bracket.

15 Claims, 6 Drawing Sheets

(56) References Cited

U.S. PATENT DOCUMENTS 8,833,596 B2 * 9/2014 Sanguinet .............. B65D 25/22
                                                 211/71.01
2008/0178623 A1 * 7/2008 Cunningham ..... B60H 1/00592
                                                 62/244

* cited by examiner

BICYCLE SAFE SYSTEM

TECHNICAL FIELD

The disclosed technology relates generally to secure storage, and more particularly, some embodiments relate to a bicycle safe system.

DESCRIPTION OF THE RELATED ART

Bicycles serve many different functions. Bicycles represent a fun outdoor activity for both children and adults, providing a fun way to enjoy the outdoors while exercising. For many, bicycles are a means of travel, whether to the store or for commuting to work. Many communities are encouraging the use of bicycles for daily travel by creating or improving infrastructure such as bicycle lanes and bicycle racks.

At its base level, a bicycle consists of two wheels connected by a frame. The frame is narrow to avoid interfering with a person's legs while pedaling. Attachments are necessary to hold any items, from cages for holding water bottles to panniers for providing storage capacity. Panniers either require racks attached over the front or rear wheel, and the panniers hang over the side of the wheels. In many cases, a cyclist could wear a backpack to store items. There is no secure and easy solution, however, for securely holding smaller items that a cyclist may need, but for which a pannier or backpack would be inefficient and add undue weight to the bicycle or cyclist.

BRIEF SUMMARY OF EMBODIMENTS

According to various embodiments of the disclosed technology, a safe and secure form of storage—a cycle safe—of smaller items for a bicycle is provided that provides secure storage efficiently without impacting the operation of the bicycle. The system includes a secure container for storing items. In many cases, the container may have dimensions similar to a water bottle one might find held in a cage on a bicycle. In this way, it would not be apparent that the container is not a water bottle upon first inspection, increasing the security of items stored in the container. A bracket can be attached to the inner frame. The bracket may be similar to bicycle cages that are used to hold water bottles in place while riding. When the container is inserted into the bracket, a locking mechanism in the cap of the container engages with a slot in the bracket to secure the container within the bracket such that the container cannot be removed from the bracket, and the cap cannot be removed from the container. In this way, a cyclist can be secure in knowing that any items stored in the cycle safe are protected.

According to an embodiment of the disclosed technology, a system for securely storing item on a bicycle includes a container and a bracket. The container has a first cylindrical portion with an open end. A first connection component is disposed on the exterior surface of the first portion at the open end. A second portion serves as a cap for the container. The second portion includes a mating section with a second connection component disposed on an interior face and configured to connect with the first connecting component on the first portion. The second portion also includes a lock section connected to the mating section, the lock section housing a locking mechanism. The locking mechanism comprises a user interface (e.g., a combination dial) and a latch, the latch being housed inside the lock section and able to be moved out of the lock section through a latch opening disposed on a side of the lock section. The user interface may be disposed on the top face of the lock section. The bracket includes a base member with an opening at one end configured to accept the latch, a stopper at the opposite end, and a lateral support component configured to eliminate lateral movement of the container. When the container is inserted into the bracket and the locking mechanism is engaged, the latch engages with the opening on the base member and the container is immovably secured in the bracket.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein is directed toward a system for storing items on a bicycle. More particularly, the various embodiments of the technology disclosed herein relate to a cycle safe including a locking mechanism such that a container cannot be opened or removed without entering a combination or using a key. Accordingly, with various embodiments, a cyclist can be confident in the security of small items stored on the bicycle without the need to keep everything on his or her person after arriving at a destination. The appearance of the cycle safe container helps secure the potential contents from others as on first appearance it looks like a regular water bottle. A cyclist may secure small items in the cycle safe without the need for clunky and inefficient backpacks or panniers.

Figure 1:
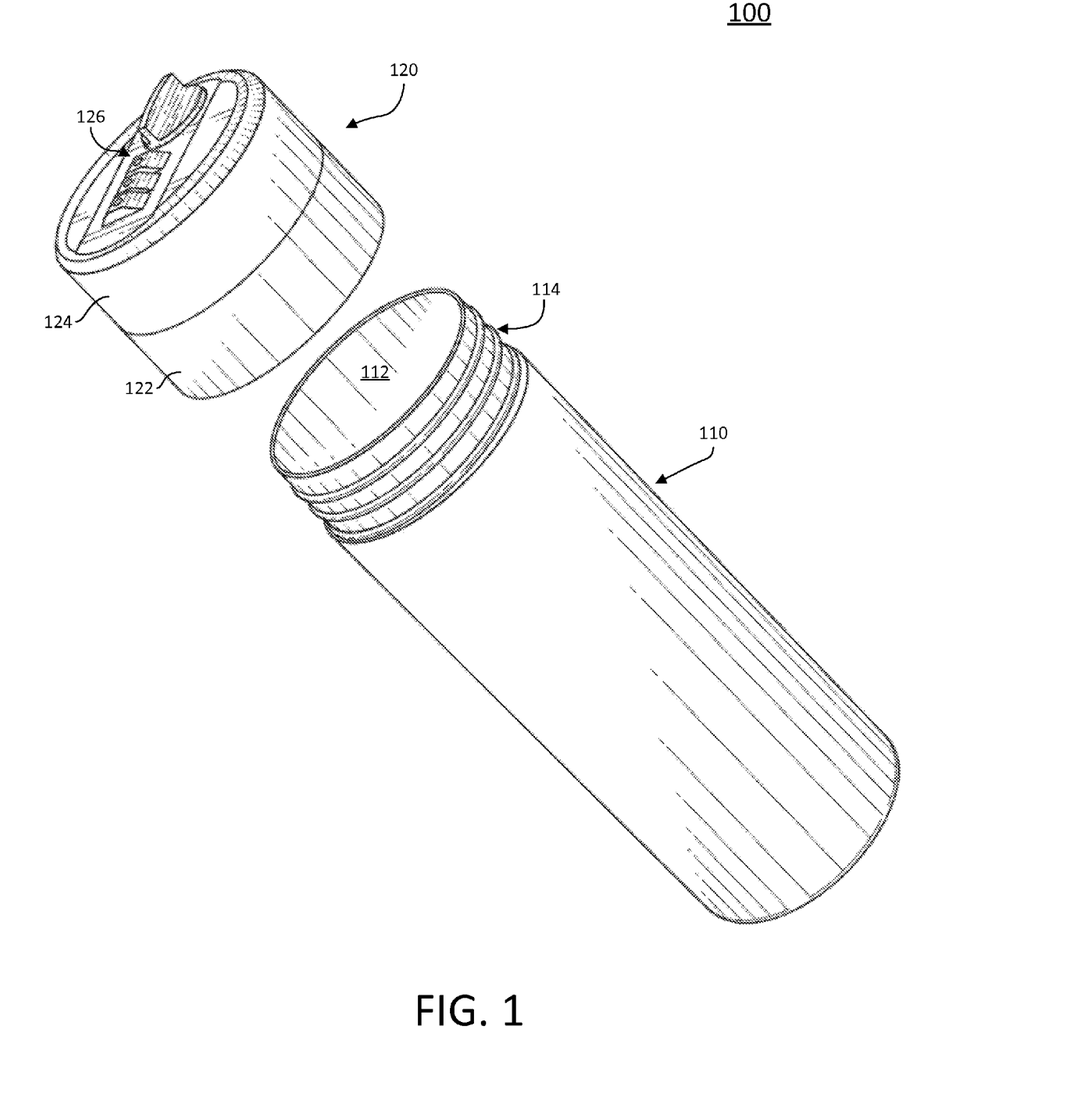
FIG. 1 is an exploded-view illustration of an example container of a bicycle safe system in accordance with the present disclosure.

One component of the cycle safe system is the container. FIG. 1 illustrates an exploded view of an example container 100 in accordance with the present disclosure. In the example embodiment, the container 100 includes a first portion 110 and a second portion 120. The first portion 110 represents the body of the container 100, where the items are placed for storage. As illustrated, the first portion 110 is a cylindrical tube with an interior cavity 112. In other embodiments, the first portion 110 may be circular or elliptical. Although shown as having a smooth exterior surface, the first portion 110 may include a textured surface in some embodiments to improve grip. In some embodiments, the exterior surface of the first portion 110 may include shallow channels positioned to accept a person's fingers.

The second portion 120 includes a mating section 122 and a lock section 124. The lock section 124 has a user interface 126 disposed on its top face. The second portion 120 is discussed in more detail with reference to FIGS. 2 and 3. The second portion 120 is configured to connect with the first portion 110 to seal the interior cavity 112. In this way, items placed in the interior cavity are secured from falling out. In other words, the second portion 120 serves as the cap of the container 100. In various embodiments, the first portion 110 and the second portion 120 have the same cross-section. For example, where the first portion 110 is a cylindrical tube, the second portion 120 may also have a cylindrical form factor so that the two portions are compatible. The cylindrical cross-section may be a circle or ellipse.

As depicted in FIG. 1, in some embodiments the second portion 120 is a physically separate component from the first portion 110. In other embodiments, the second portion 120 may be connected to the first portion 110 by a hinge such that the first portion 110 and the second portion 120 are connected, but a user may still access the interior cavity 112. Such an embodiment can help eliminate the loss of one component or the other. To still allow the flexibility of a physically separate cap but still avoid the potential for loss, the second portion 120 may be connected to the first portion 110 via a cord in some embodiments, similar to how some water bottle caps are secured to the bottle.

Figure 2:
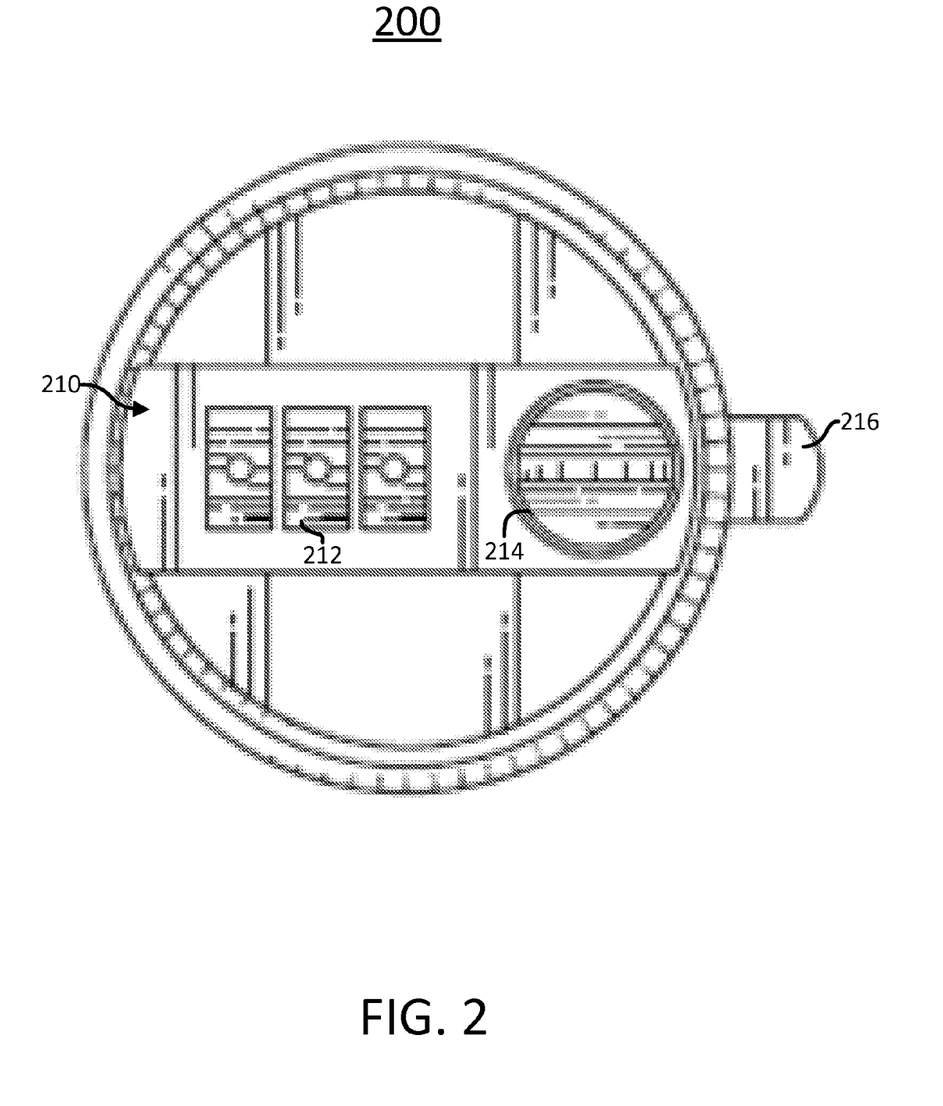
FIG. 2 is an illustration of an example cap and locking mechanism of a bicycle safe system in accordance with the present disclosure.

As discussed above, the second portion includes a mating section and a lock section. FIG. 2 provides a view of the top face of an example second portion 200 in accordance with the present disclosure. As illustrated in FIG. 2, a user interface 210 is disposed such that a user may operate the locking mechanism housed within the second portion 200. The user interface 210 makes up one piece of the locking mechanism. In some embodiments, the user interface 210 may include a lock input 212 and a latch control component 214. The lock input 212 provides a means by which a user may operate the locking mechanism, i.e. disengage the locking mechanism such that the container may be removed and opened. In various embodiments, the lock input 212 may be a combination lock, as illustrated in FIG. 2. The combination lock of FIG. 2 is a multiple-dial combination lock, but other types and configurations of combination locks may be utilized. Non-limiting example of combination locks employable in accordance with the present disclosure include: a numeric dial, an alphabetic dial, a symbol dial, an alphanumeric dial, or any other sequence combination. In various embodiments, a single dial combination lock may be implemented.

The latch control component 214 provides the user with the ability to move the latch 216. As will be discussed in more detail with reference to FIG. 4, the latch 216 functions in conjunction with the bracket to secure the container. In various embodiments, the latch control component 214 may be one of: a twist knob; a slider; a lever; or a button. To engage the locking mechanism, the user may use the latch control component 114 to engage the latch 216 with the bracket. Once engaged, the latch control component 114 may not move the latch 216 unless a proper combination or key is inserted into the lock input 212.

In some embodiments, the lock input 212 and the latch control component 214 may be the same component. For example, where the locking mechanism utilizes a key, when the proper key is inserted into the lock input 212, the latch 216 may be moved by twisting the key into a disengage position. In such ways, a separate latch control component 214 is not needed as turning the key provides the same functionality.

The latch 216 engages with the bracket in securing the container. As depicted, the latch 216 may be a solid bar in various embodiments. In other embodiments, the latch 216 may have a hook disposed on the exposed end. The hook may be designed to connect with a bar, loop, or other connecting means disposed in the opening of the bracket, discussed in more detail with reference to FIG. 4. This may provide additional securing strength to the latch 216

Figure 3:
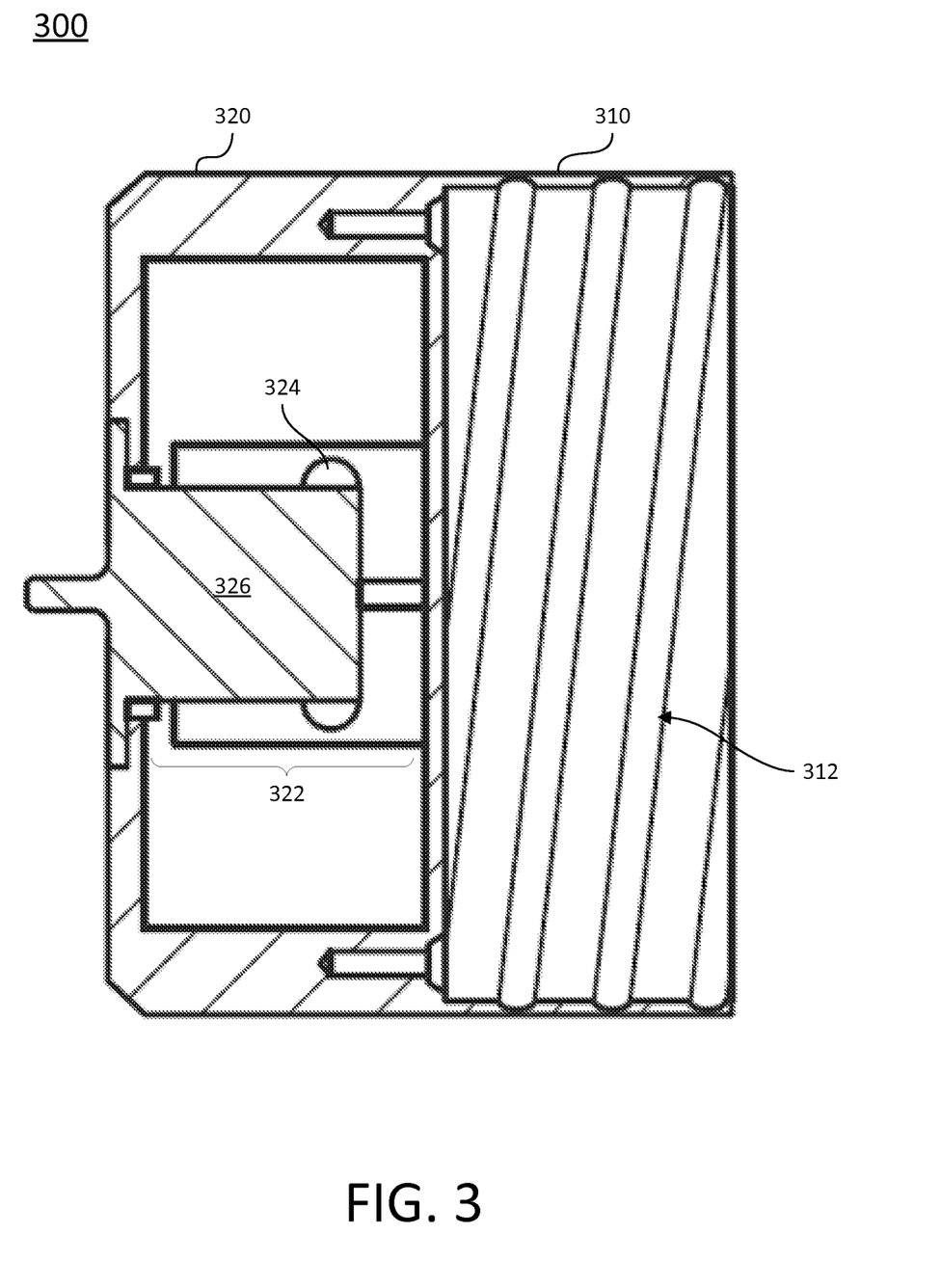
FIG. 3 is a cross-sectional view of an example cap and locking mechanism of a bicycle safe system in accordance with the present disclosure.

FIG. 3 shows a cross-sectional view of an example second portion 300 in accordance with the present disclosure. As illustrated, the second portion 300 includes a mating section 310 and a lock section 320. The mating section 310 provides an interface between the cap and the body of the container. In some embodiments, the body of the container may be the first portion 110 discussed above with reference to FIG. 1. The mating section 310 includes a second connection component 312. As depicted, the second connection component 312 in various embodiments may be grooves disposed on an interior face of the mating section 310. The particular characteristics of the second connection component are reliant on the characteristics of the first connection component of the body of the container. In other embodiments, the second connection component 312 may be bars disposed on the interior surface of the mating section 310 that are configured to connect with cleats representing the first connection component of the body of the container. Other embodiments may have the first and second connection components disposed not on exterior and interior surface of the container sections, but instead disposed on the rim of each. For example, a grove disposed on the rim of the mating section with bars disposed thereon may be the second connection component 312 while the first connection component may be cleats disposed on the rim of the body of the container.

As depicted in FIG. 3, the lock section 320 houses the internal components of the locking mechanism 322. The latch 326 of the locking mechanism 322 is configured to be moved in and out of the lock section 320 through a latch opening 324. The latch opening 324 is disposed on the side of the lock section 320. In various embodiments, the latch 326 may be a solid bar that is moved in and out of the lock section 320 laterally.

Figure 4:
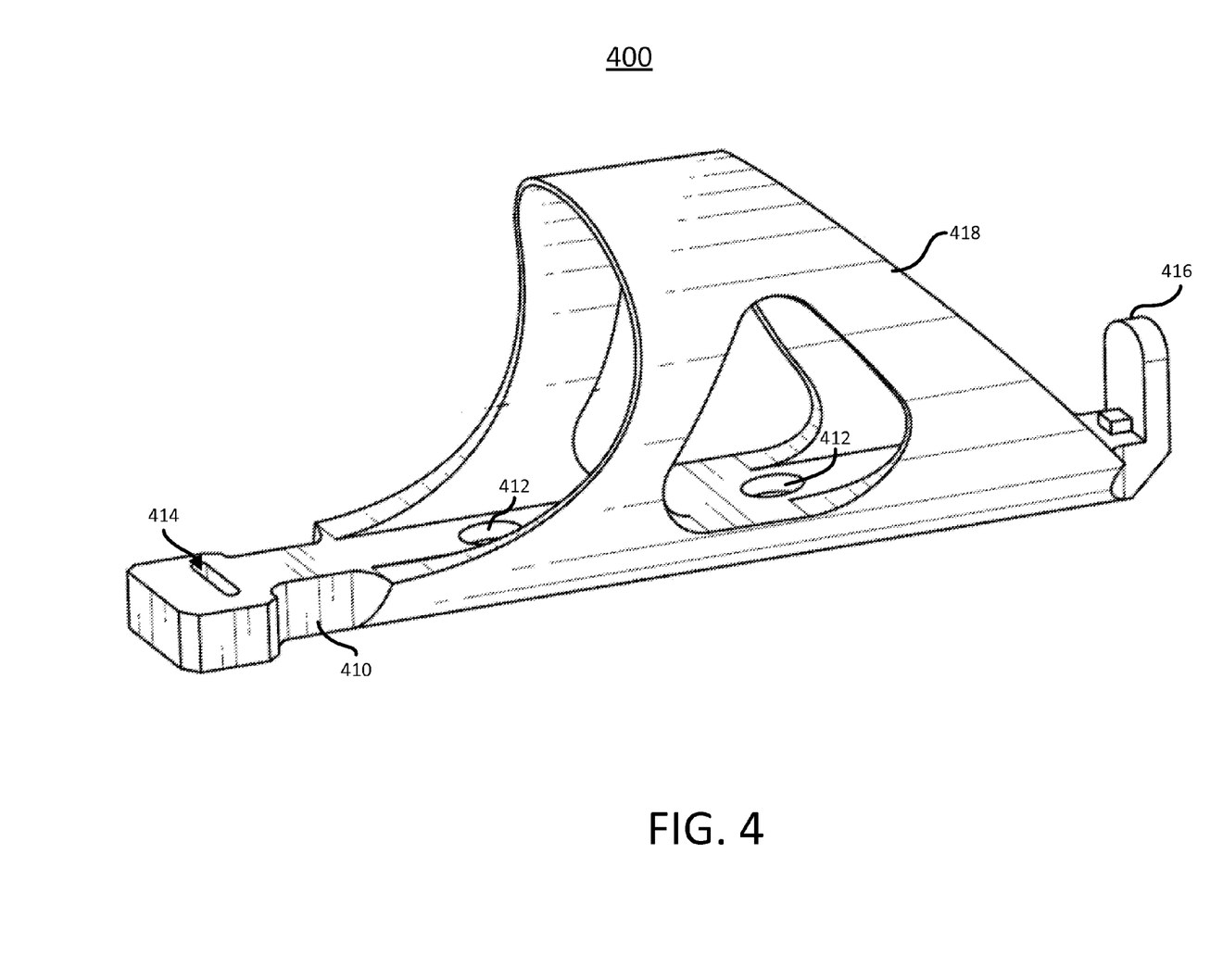
FIG. 4 is an example bracket of a bicycle safe system in accordance with the present disclosure.

In addition to the container, the cycle safe system also includes a bracket. FIG. 4 illustrates an example bracket 400 in accordance with the present disclosure. The bracket 400 includes a base member 410. The base member 410 serves as the backbone of the bracket, providing stability and a base upon which to connect the additional components of the bracket 400. The bracket 400 mounts to a frame of a bicycle through the base member 410. In various embodiments, the base member 410 may be coupled to the frame using fasteners through the coupling holes 412, such as screws or bolts. Clamps may be utilized in some embodiments to provide a strong connection without the need to screw or drill into the frame of the bike. In other embodiments, the base member may be attached to the frame via joining methods, such as welding, gluing, or cementing the base member 410 to the frame.

At one end of the base member 410 is an anchor opening 414. The anchor opening 414 is configured to line up with the latch discussed above with reference to FIGS. 2 and 3. When the locking mechanism is engaged, the latch engages with the anchor opening 414 to secure the container within the bracket 400. In various embodiments, the anchor opening 414 may be a slot in the base member dimensioned to accept the latch, as illustrated in FIG. 4. The anchor opening 414 may include a support bar disposed inside the anchor opening 414 with which a hook disposed at the end of a latch may contact. Instead of including a bar within, the anchor opening 414 in some embodiments may be a channel etched into the base member 410 with two openings, the portion of the base member 410 spanning the channel serving the same function as the bar.

The bracket may also include a stopper 416 in some embodiments. The stopper 416 can serve to make sure that the container does not fall out the bottom of the bracket. As illustrated, the stopper 416 may be a protrusion extending orthogonally to the base member 410. In some embodiments, the protrusion may extend the entire width of the container. In other embodiments, the protrusion may extend to a midpoint of the container. A full plate disposed on the end of the bracket 400 and oriented such that the flat face is perpendicular to the base member may be used in some embodiments.

To secure the container to the bracket 400 and limit lateral movement, a lateral support component 418 is connected to the sides of the base member. The lateral support component 418 may fully enclose the container, as illustrated in FIG. 4, in some embodiments. Other embodiments may implement different styles of thr lateral support component 418. Some embodiments may have the lateral support component 418 connected to the base member 410 on only one side, with the lateral support component 418 extending up and over the container, but not fully encircling the container. The lateral support component 418 may include multiple support members in some embodiments, each support member being connected to one side of the base member 410 and extending up and over the container. In some embodiments, a row of support members may be disposed on both sides of the base member 410, with each member not contacting each other or the opposite side of the base member 410. Combinations of multiple supporting configurations may be used for the lateral support component 418.

To assist in inserting the container, the lateral support component 418 and the stopper 416 may include notches or grooves to act as guides for the container. For example, a set of grooves disposed on an interior surface of the lateral support component 418 may correspond to edges disposed on the exterior surface of the container. When inserting the container into the bracket 400, the container will only slide into place when the edges and grooves align. In this way, the user can be certain that the locking mechanism is correctly positioned to secure the container. Similarly, a notch could be disposed on the stopper 416. Only when the notch lined up with a corresponding indent on the container's base would the container be correctly inserted into the bracket 400.

Figure 5:
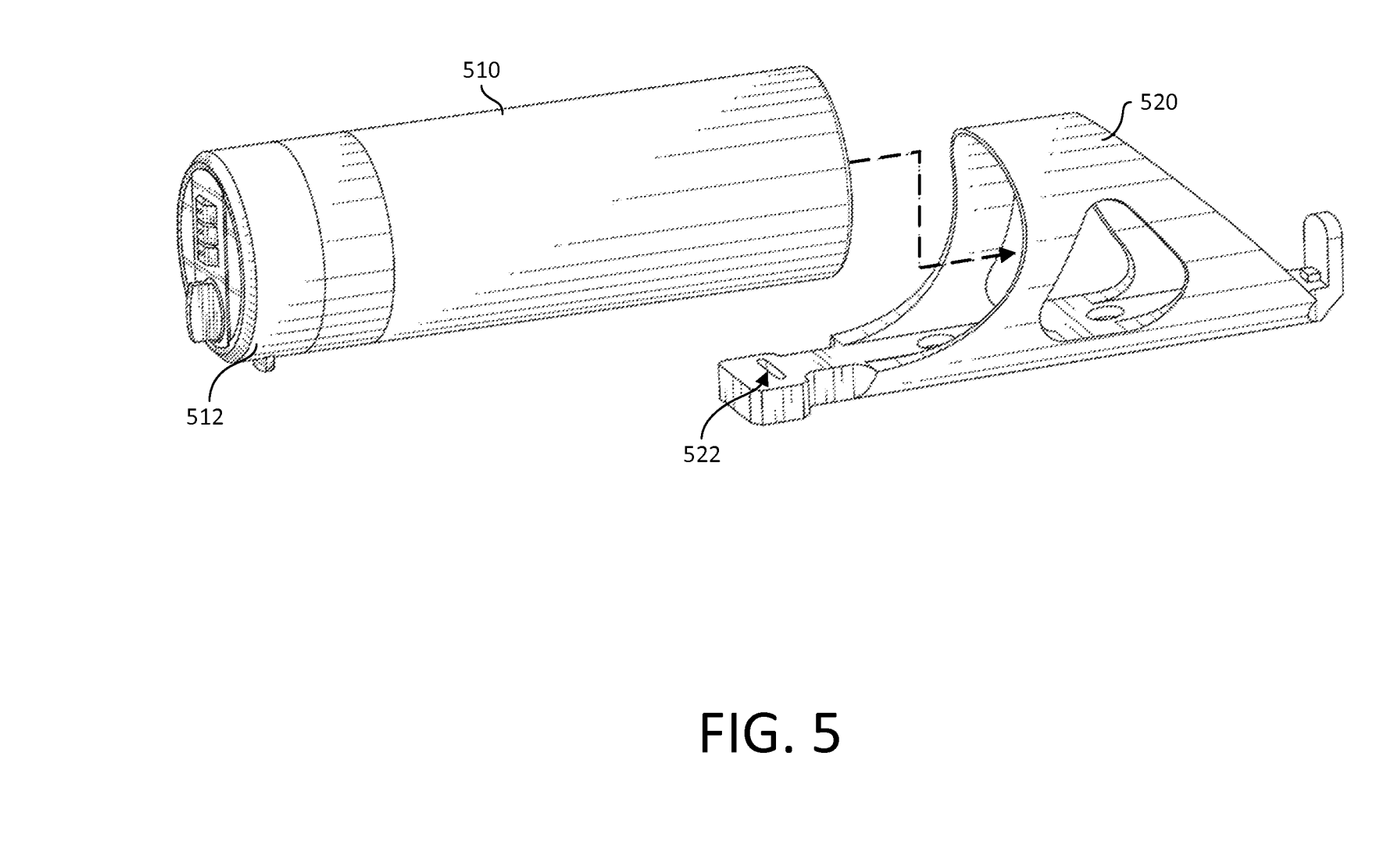
FIG. 5 shows the components of an example bicycle safe system separated in accordance with the present disclosure.
Figure 6:
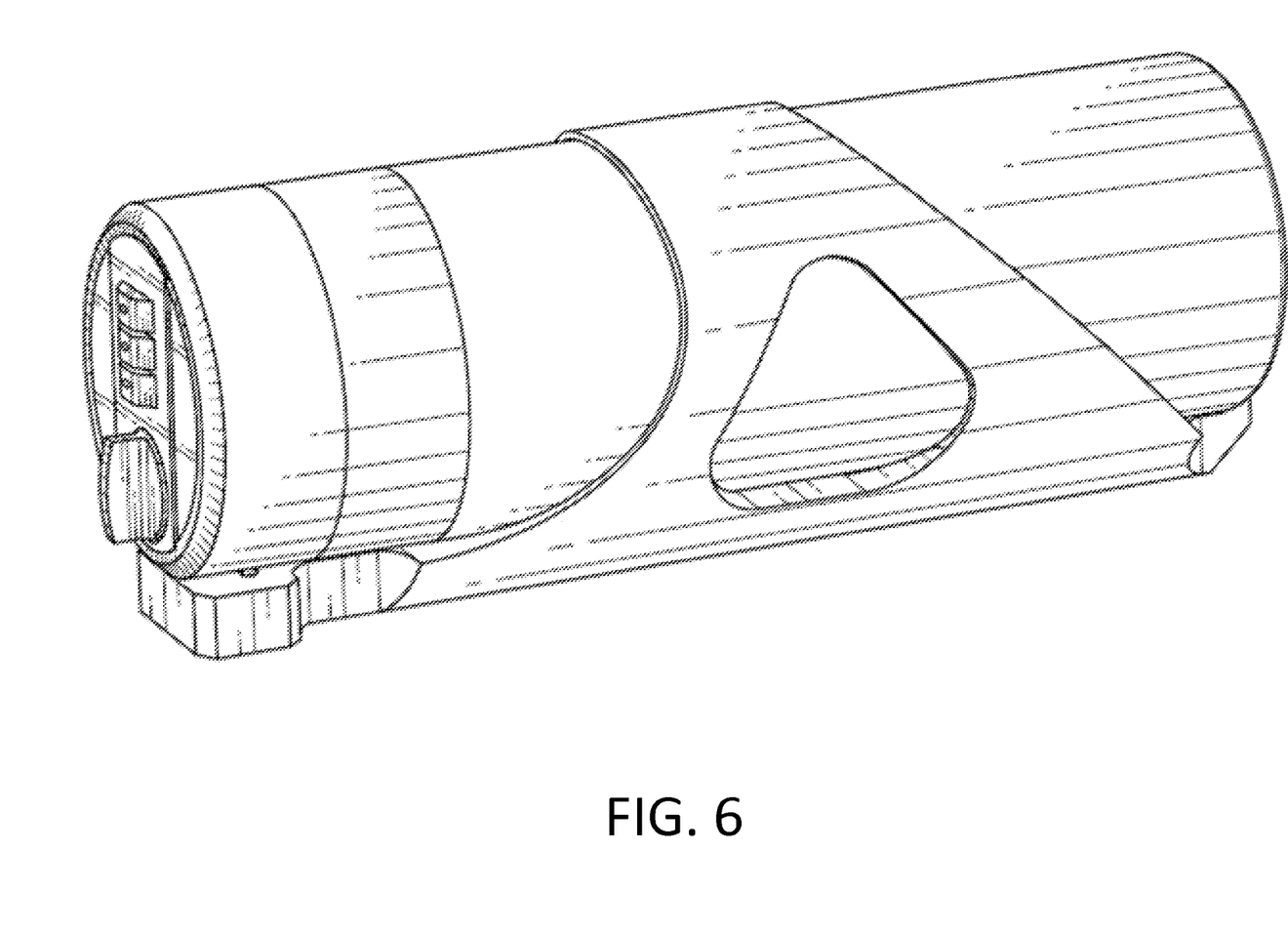
FIG. 6 shows the components of an example bicycle safe system connected in accordance with the present disclosure.

FIGS. 5 and 6 illustrate how the components of the example cycle safe interact in accordance with the present disclosure. As illustrated in FIG. 5, the container 510 is inserted into the bracket 520. The second portion 512 of the container 510 lines up with the anchor opening 522 of the bracket 520. The container 510 and bracket 520 combined is illustrated in FIG. 6.

The container and bracket may be made out of a variety of materials. To provide additional security, the container and bracket may be made out of a metal—such as aluminum, steel, iron, titanium, or some other suitable metal or metal alloy. If weight is an issue, lighter but equally as strong materials, such as hard plastics or other polymer materials, may be used in some embodiments. The material used to make the container may differ from that used to make the bracket in some embodiments. For example, the container may be made of aluminum while the bracket is made of a plastic. In some embodiments, the composition of the first portion and second portion of the container may also differ. For example, the second portion (or cap) may be made of a plastic while the first portion (or body) is made of steel.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for storing items, comprising:
   a container, comprising;
      a first portion having an open end, a first connection component disposed on an exterior surface of the first portion at the open end; and
      a second portion having a mating section and a lock section, a second connection component disposed on an interior face of the mating section, a locking mechanism housed within the lock section, the locking mechanism comprising a user interface and a latch, the user interface disposed on a top face of the lock section, and a latch opening disposed on a side of the lock section such that the latch may extend out from the lock section; and
   a bracket, comprising:
      a base member, the base member having an anchor opening disposed at a first end and a stopper disposed at a second end and one or more coupling holes configured to enable mounting of the bracket on a bicycle frame; and
      a lateral support component;
   wherein the second connecting component is configured to mate with the first connecting component; and
   wherein when the container is inserted into the bracket, and the locking mechanism is engaged, the latch engages with the anchor opening on the base member and the container is locked in the bracket.

2. The system of claim 1, wherein the first and second portions of the container comprise: aluminum; steel; iron; titanium; carbon fiber; metal alloy; or a combination thereof.

3. The system of claim 1, wherein the first and second portions of the container comprise molded plastic.

4. The system of claim 1, wherein the first and second portions of the container comprise a first material, and the cap comprises a second material.

5. The system of claim 1, a cross-section of the first and second portions of the container comprising a circle or an ellipse.

6. The system of claim 1, wherein the user interface comprises a combination lock or a key slot.

7. The system of claim 1, the user interface further comprising a latch control component.

8. The system of claim 7, the latch control component comprising one of: a twist knob; a slider; a lever; or a button.

9. The system of claim 1, wherein the container is removable from the bracket only when the locking mechanism is disengaged.

10. The system of claim 1, the lateral support component comprising a support band connected to one or more sides of the base member configured to surround the container when the container is inserted into the bracket such that the lateral support component eliminates lateral motion by the container.

11. The system of claim 1, the lateral support component comprising one or more support bands disposed on a first side and a second side of the base member, the one or more support bands extending from the base member the width of the container and ending in a bend towards the container such that the support bands eliminate lateral motion by the container.

12. The system of claim 1, wherein the first connecting component comprises grooves and the second connecting component comprises trenches configured to mate with the grooves of the first connecting component such that the cap connects to the container using a screwing motion.

13. The system of claim 12, wherein the exterior surface of the container near the open end is tapered, and the grooves of the first connecting component extends orthogonally from the exterior surface such that an exterior surface of the cap is flush with a non-tapered exterior surface of the container when the first connecting component and the second connecting component are mated.

14. The system of claim 1, wherein the first connecting component comprises one or more cleats, and the second connecting component comprises one or more bars configured to slide into the cleats when the cap connects to the container using a screwing motion.

15. The system of claim 1, the stopper comprising a bar protruding orthogonally to the base member to a point corresponding to a middle point of a base of the container.

* * * * *